United States Patent
Park

(10) Patent No.: US 10,313,325 B2
(45) Date of Patent: Jun. 4, 2019

(54) VEHICLE, VEHICLE SYSTEM INCLUDING THE SAME, AND CONTROL METHOD OF VEHICLE SYSTEM

(71) Applicant: HYUNDAI MOTOR COMPANY, Seoul (KR)

(72) Inventor: Sung Woo Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 171 days.

(21) Appl. No.: 15/374,497

(22) Filed: Dec. 9, 2016

(65) Prior Publication Data

US 2018/0013751 A1 Jan. 11, 2018

(30) Foreign Application Priority Data

Jul. 8, 2016 (KR) .................. 10-2016-0086835

(51) Int. Cl.
*G07C 9/00* (2006.01)
*H04W 4/40* (2018.01)
*B60R 25/24* (2013.01)
*H04L 29/06* (2006.01)
*H04W 12/06* (2009.01)
*B60R 16/023* (2006.01)

(52) U.S. Cl.
CPC ........ *H04L 63/0823* (2013.01); *B60R 16/023* (2013.01); *B60R 25/24* (2013.01); *G07C 9/00007* (2013.01); *G07C 9/00182* (2013.01); *H04L 63/105* (2013.01); *H04W 12/06* (2013.01); *H04W 4/40* (2018.02)

(58) Field of Classification Search
CPC .... H04L 63/0823; H04W 12/08; H04W 4/00; H04W 4/40; B60R 25/24; B60R 16/023; G07C 9/00007; G07C 9/00182
USPC ............................................................ 726/9
See application file for complete search history.

(56) References Cited

U.S. PATENT DOCUMENTS

2017/0236343 A1* 8/2017 Leboeuf ................ H04L 9/0825
340/5.61

FOREIGN PATENT DOCUMENTS

| JP | 2012-079109 A | 4/2012 |
| JP | 2016-045860 A | 4/2016 |
| KR | 10-1459481 B1 | 11/2014 |

\* cited by examiner

*Primary Examiner* — Kambiz Zand
*Assistant Examiner* — Aubrey H Wyszynski
(74) *Attorney, Agent, or Firm* — Morgan Lewis & Bockius LLP

(57) ABSTRACT

A vehicle includes a storage to store an authority value representing authority to access vehicle data generated by at least one vehicular component and a communicator to transmit the vehicle data and the authority value to a user terminal.

14 Claims, 6 Drawing Sheets

VEHICLE, VEHICLE SYSTEM INCLUDING THE SAME, AND CONTROL METHOD OF VEHICLE SYSTEM

CROSS-REFERENCE TO RELATED APPLICATION

This application claims the benefit of priority to Korean Patent Application No. 10-2016-0086835, filed on Jul. 8, 2016 in the Korean Intellectual Property Office, the entire disclosure of which is incorporated herein by reference.

TECHNICAL FIELD

The present disclosure relates to a vehicle, a vehicle system including the vehicle, and a control method for the vehicle system.

BACKGROUND

In general, a vehicle refers to a transportation device running on the road, and generally uses fossil fuel, electric power, or the like as a power source.

Recently, vehicles have been able to connect to a handheld user terminal, such as a smart phone or a tablet personal computer (PC), to transmit desired data to or receive desired data from the user terminal. The vehicle may thus perform an additional function for user convenience (e.g., an audio function, a video function, a navigation function, an air conditioning control function, a seat control function, an illumination control function, etc.) using the user terminal.

Such a vehicle includes various vehicular components that assist the driver in operating the vehicle. These vehicular components may transmit generated various information, e.g., a fuel injection amount, a vehicle mileage, gas mileage information, an illumination sensor value, etc. as vehicle data to a user terminal.

In the related art, when vehicle data is transmitted to a user terminal, the user terminal directly provides the vehicle data to an application regardless of access authority assigned to the application or directly sets authority to access the vehicle data with respect to the application.

SUMMARY

Therefore, it is an aspect of the exemplary embodiments to provide a vehicle capable of directly setting authority to access vehicle data with respect to an application.

It is another aspect of the exemplary embodiments to provide a vehicle system capable of determining access authority in applications using an authority value of vehicle data which is set by a vehicle, and a method of controlling the vehicle system.

Additional aspects of the exemplary embodiments will be set forth in part in the description which follows and, in part, will be obvious from the description, or may be learned by practice of the disclosure.

According to an aspect of an exemplary embodiment, there is provided a vehicle and a communicator. The vehicle includes a storage to store an authority value representing authority to access vehicle data generated by at least one vehicular component. The communicator transmits the vehicle data and the authority value to a user terminal.

The storage may store at least one among an authority value representing that all applications are accessible, an authority value representing that only a certified application is accessible, and an authority value representing that only a selected application is accessible.

The storage may further store information regarding the vehicle data corresponding to the authority value, and the communicator may transmit the authority value corresponding to the vehicle data to the user terminal.

The vehicle may further include a controller to determine the authority value corresponding to the vehicle data.

The communicator may receive a signal requesting vehicle data from the user terminal, and may transmit the vehicle data requested by the user terminal and an authority value corresponding to the requested vehicle data to the user terminal.

According to another aspect of an exemplary embodiment, there is provided a vehicle system including a vehicle and a user terminal. The vehicle transmits an authority value representing authority to access vehicle data generated by at least one vehicular component and the vehicle data to a user terminal. The user terminal, in which at least one application is installed may be configured to permit an application having a certificate including the authority value to access the vehicle data.

The vehicle system may further include a certificate server to transmit a certificate of the at least one application installed in the user terminal.

The user terminal may transmit a signal requesting a certificate to the certificate server.

The vehicle may transmit, to the user terminal, one of an authority value representing that all applications are accessible, an authority value representing that only a certified application is accessible, and an authority value representing that only a selected application is accessible.

The user terminal may transmit the vehicle data to a server of an application having a certificate including the authority value.

The vehicle may store information regarding the vehicle data corresponding to the authority value, and may transmit the authority value corresponding to the vehicle data to the user terminal.

The vehicle may determine the authority value corresponding to the vehicle data and may transmit the authority value corresponding to the vehicle data to the user terminal.

The user terminal may transmit a signal requesting vehicle data to the vehicle, and the vehicle may transmit the vehicle data requested by the user terminal and an authority value corresponding to the requested vehicle data to the user terminal.

According to another aspect of an exemplary embodiment, there is provided a method of controlling a vehicle system. The method includes steps of transmitting an authority value representing authority to access vehicle data generated by at least one vehicular component and the vehicle data to a user terminal, and permitting an application having a certificate including the authority value to access the vehicle data.

Before the step of permitting the application to access the vehicle data, the method may further include receiving a certificate of an application installed in the user terminal.

Before the step of receiving the certificate, the method may further include transmitting a signal requesting the certificate to a certificate server.

The step of transmitting the authority value and the vehicle data to the user terminal may include transmitting, to the user terminal, one of an authority value representing that all applications are accessible, an authority value representing that only a certified application is accessible, and an authority value representing that only a selected application is accessible.

The method may further include transmitting the vehicle data to a server of an application having a certificate including the authority value.

The step of transmitting the authority value and the vehicle data to the user terminal may include transmitting the authority value corresponding to the vehicle data to the user terminal.

The step of transmitting the authority value and the vehicle data to the user terminal may include determining the authority value corresponding to the vehicle data and transmitting the authority value corresponding to the vehicle data to the user terminal.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
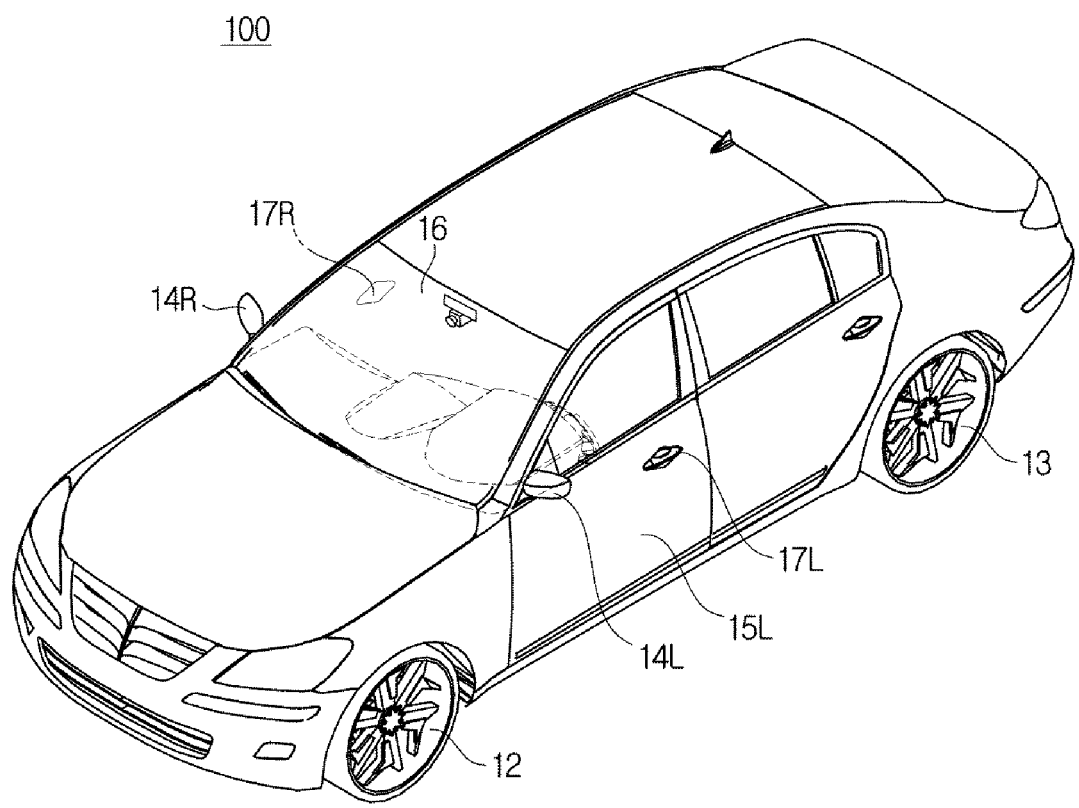
FIG. 1 is a diagram illustrating the appearance of a vehicle in accordance with one exemplary embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

Figure 2:
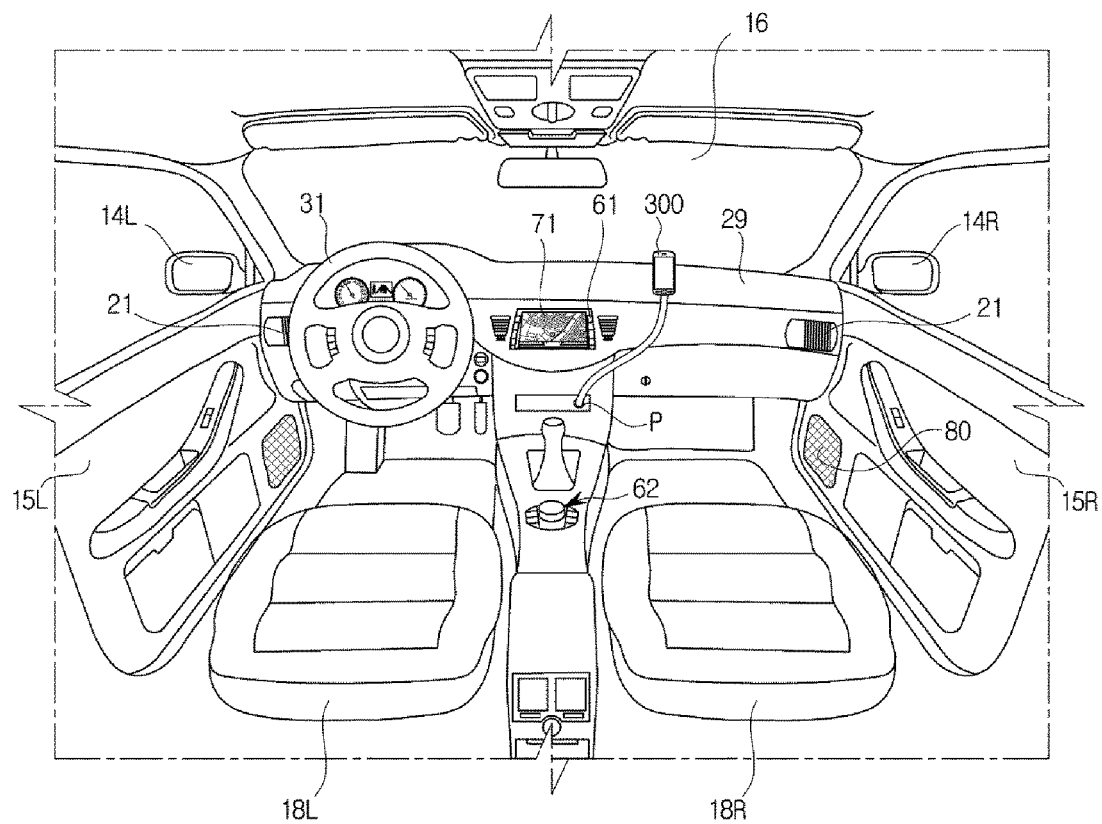
FIG. 2 is a diagram illustrating an internal structure of a vehicle in accordance with one exemplary embodiment.
Figure 3:
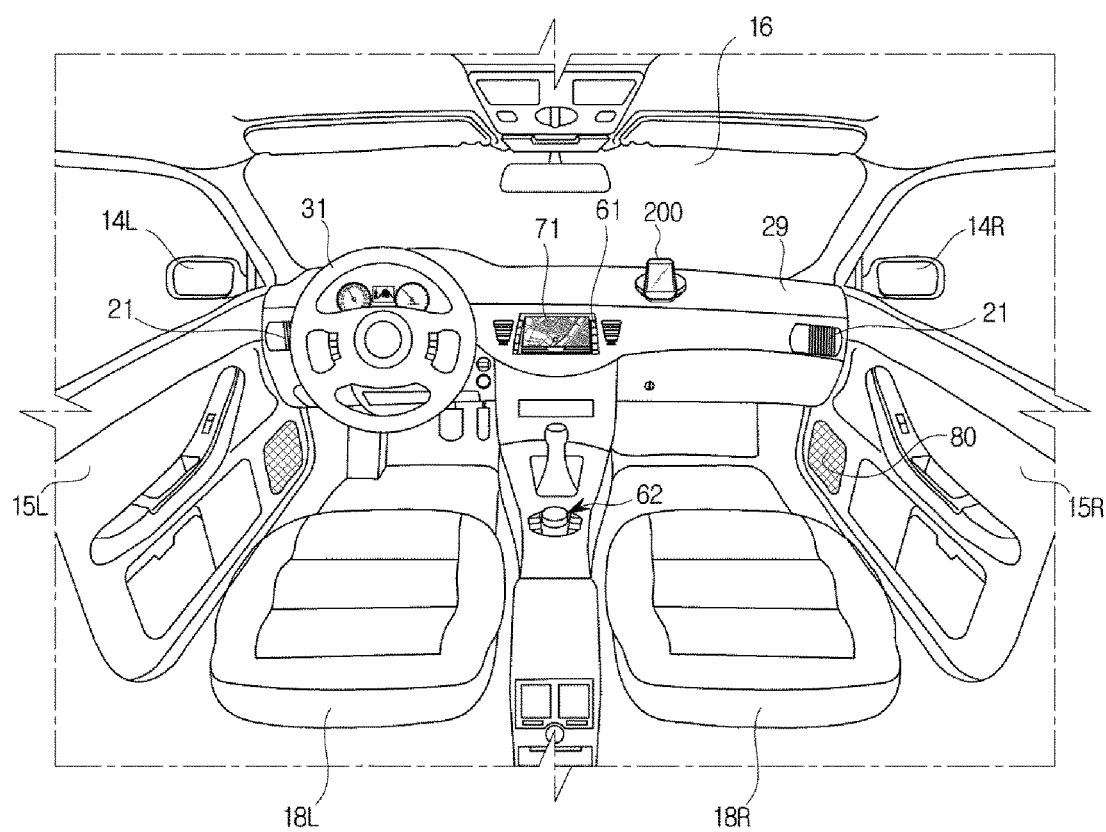
FIG. 3 is a diagram illustrating an internal structure of a vehicle in accordance with another exemplary embodiment.

FIG. 1 is a diagram illustrating the appearance of a vehicle in accordance with one exemplary embodiment. FIG. 2 is a diagram illustrating an internal structure of a vehicle in accordance with one exemplary embodiment. FIG. 3 is a diagram illustrating an internal structure of a vehicle in accordance with another exemplary embodiment.

Referring to FIG. 1, the appearance of a vehicle 100 in accordance with one exemplary embodiment includes wheels 12 and 13 for moving the vehicle 100, a door 15L which shields the inside of the vehicle 100 from the outside, a front glass 16 through which a driver in the vehicle 100 may view a sight in front of the vehicle 100, and side-view mirrors 14L and 14R through which the driver may view a sight behind the vehicle 100.

The wheels 12 and 13 include the front wheel 12 at the front of the vehicle 100 and the rear wheel 13 at the back of the vehicle 100. A driving device (not shown) inside the vehicle 100 provides turning force to the front wheel 12 or the rear wheel 13 so as to move the vehicle 100 in a forward or backward direction. The driving device may employ an engine which burns fossil fuel to generate turning force, or a motor which receives power from a condenser to generate turning force.

The door 15L and a door 15R (see FIG. 2) are provided at left and right sides of the vehicle 100 to be rotationally moved, whereby a driver or a passenger may get in the vehicle 100 when they are opened and the inside of the vehicle 100 may be shielded from the outside when they are closed. Furthermore, handles 17L, 17R may be provided at outer sides of the vehicle 100, through which the doors 15L and 15R (see FIG. 2) may be opened or closed.

The front glass 16 is provided at a front and upper side of a body of the vehicle 100, whereby a driver in the vehicle 100 may obtain visual information in front of the vehicle 100. The front glass 16 may be also referred to as a windshield glass.

The side-view mirrors 14L and 14R include the left side-view mirror 14L at a left side of the vehicle 100 and the right side-view mirror 14R at a right side of the vehicle 100, whereby a driver in the vehicle 100 may obtain visual information at lateral and rear sides of the vehicle 100.

In addition, although not shown, the vehicle 100 may include sensor devices, such as a proximity sensor which senses an obstacle or other vehicles at a front, rear or lateral side of the vehicle 100, a rain sensor which senses precipitation and a precipitation rate, an illumination sensor which senses brightness of an external environment of the vehicle 100, etc.

The proximity sensor may transmit a sensing signal to a front, rear, or lateral side of the vehicle 100 and receive a signal reflected from an obstacle such as another vehicle.

Whether an obstacle is present at the front, rear, or lateral side of the vehicle 100 may be sensed and the position of an obstacle may be detected on the basis of waveforms of the reflected signal.

Referring to FIG. 2, an audio/video navigation (AVN) display 71 and an AVN input 61 may be provided in a central region of a dashboard 29. The AVN display 71 may selectively display at least one among an audio screen, a video screen, and a navigation screen, and may further display various control screens related to the vehicle 100 or a screen related to additional functions of the vehicle 100. For example, the AVN display 71 may display a situation of the road, an obstacle, etc. at the front, rear, or lateral side of the vehicle 100 in the form of an image.

The AVN display 71 may be embodied as a liquid crystal display (LCD), a light-emitting diode (LED), a plasma display panel (PDP), an organic light-emitting diode (OLED), a cathode ray tube (CRT), or the like.

The AVN input 61 may be provided in the form of a hard key in a region adjacent to the AVN display 71. When the AVN display 71 is embodied as a touch screen type, the AVN input 61 may be provided in the form of a touch panel on a front surface of the AVN display 71.

A jog shuttle type center input 62 may be provided between a driver seat 18L and a passenger seat 18R. A driver may input a control command by turning the center input 62, applying pressure to the center input 62, or pushing the center input 62 in an upward, downward, left, or right direction.

The vehicle 100 may include a sound output 80 which outputs sound. The sound output 80 may be a speaker. The sound output 80 may output desired sound needed to perform an audio function, a video function, a navigation function, or any additional function.

A steering wheel 31 is provided on the dashboard 29 near the driver seat 18L.

The vehicle 100 may include an air conditioning device to perform both heating and cooling, and control internal temperature of the vehicle 100 by discharging heated or cooled air via a vent 21.

The vehicle 100 further includes a terminal connecter P.

The terminal connecter P may include a Universal Serial Bus (USB) port, an auxiliary (AUX) port, a cigar jack, etc. and may be connected to a user terminal 200 via wire (i.e., a cable) as illustrated in FIG. 2. Referring to FIG. 2, a plurality of terminal connecters P may be provided.

The vehicle 100 may further include a wireless communication module, such as a Bluetooth module, a Wifi module, a wireless broadband module, an infrared communication module, a radio-frequency identification (RFID) communication module, a near-field communication (NFC) communication module, or a Zigbee communication module, and may be connected to the user terminal 200 via a wireless network as illustrated in FIG. 3. The user terminal 200 is a device which secures portability and mobility and examples thereof include various handheld devices.

The vehicle 100 may be connected to the user terminal 200 via the terminal connecter P to provide a user with a mirroring service or to charge the user terminal 200 connected thereto. When the vehicle 100 provides the mirroring service, the AVN display 71 may output information received from the user terminal 200.

The mirroring service is technology whereby information is output to various display devices of the vehicle 100 or the vehicle 100 is controlled on the basis of a signal received from the user terminal 200. Hereinafter, the mirroring service should be understood to include at least one among Apple CarPlay, Android Auto, and Nokia Mirrorlink. However, the mirroring service is not limited thereto and should be understood as a broad concept covering modifications made within a range which would be obvious to those of ordinary skill in the art.

Furthermore, the user terminal 200 connected to the vehicle 100 via the terminal connecter P may drive an application installed in the user terminal 200 using vehicle data received from the vehicle 100 or may transmit the vehicle data to an application server which manages the application.

Figure 4:
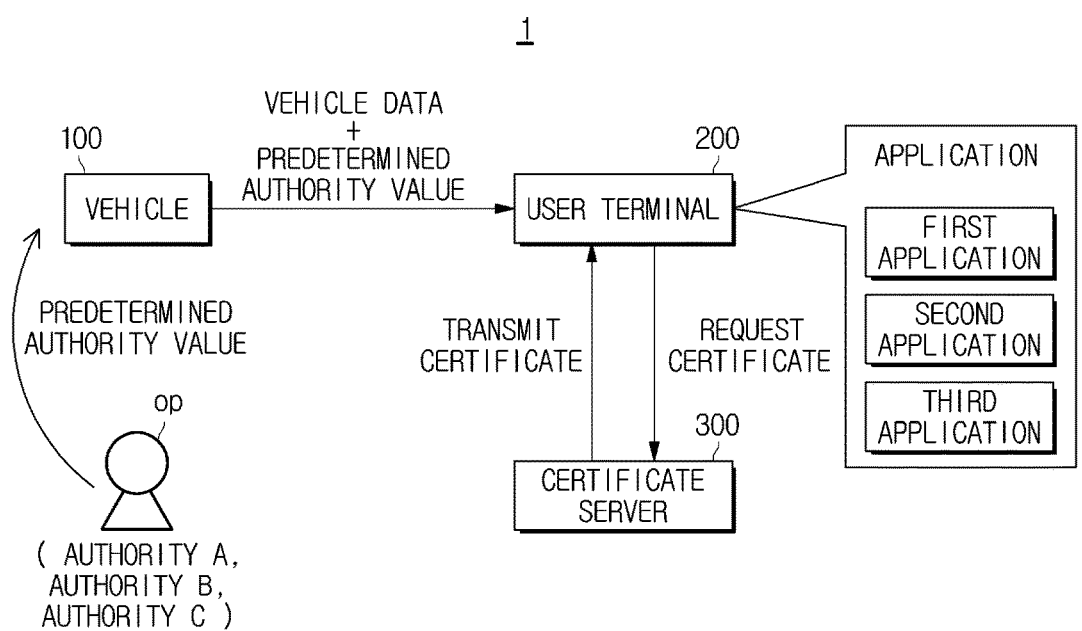
FIG. 4 is a control block diagram of a vehicle system in accordance with one exemplary embodiment.

A vehicle and a vehicle system including the vehicle in accordance with one embodiment will be described with reference to FIG. 4 below. FIG. 4 is a control block diagram of a vehicle system in accordance with one embodiment.

Referring to FIG. 4, a vehicle system 1 in accordance with one exemplary embodiment includes a vehicle 100, a user terminal 200, and a certificate server 300.

The vehicle 100 may include at least one vehicular component. The at least one vehicular component may include various electronic components which are included or installed in the vehicle 100 and which generate data. The at least one vehicular component may include, for example, a global positioning system (GPS) module which generates location information of the vehicle 100, a camera module which generates image data in front of or at the rear of the vehicle 100, a steering wheel control module which generates steering angle data of the steering wheel 31, the sensor devices described above with reference to FIGS. 1 and 2, the AVN input 61 which generates a user's command data, etc. The at least one vehicular component may further include components of the vehicle 100 which generate various data related to the vehicle 100, e.g., a fuel injection amount, a mileage of the vehicle 100, etc. However, examples of the at least one vehicular component are not limited thereto, and the at least one vehicular component should be understood as a broad concept covering modifications made within a range which would be obvious to those of ordinary skill in the art.

In accordance with one exemplary embodiment, the vehicle 100 may store authority values, which are input by an operator op, beforehand during a manufacturing process or a maintenance process thereof.

The authority values are information representing authority to access vehicle data generated by the vehicle 100 with respect to each application. For example, the authority values may include authority A representing that all applications are accessible, authority B representing that only an application certified by the certificate server 300 is accessible, and authority C representing that only a specific application certified by the certificate server 300 and previously set or designated is accessible.

The vehicle 100 may store at least one authority value and transmit the stored at least one authority value and the vehicle data to the user terminal 200.

As one example, the at least one authority value stored in the vehicle 100 may be a value manually input by the operator op. For example, the authority C may be input to the vehicle 100 by the operator op. In this case, the vehicle 100 transmits the authority C to the user terminal 200, together with the vehicle data.

As another example, the at least one authority value stored in the vehicle 100 may include a plurality of values manually input by the operator op. For example, the authority A, the authority B, and the authority C may be input to the vehicle 100 by the operator op.

In this case, the vehicle 100 may receive designation of authority values corresponding to pieces of generated vehicle data from the operator op, determine vehicle data requested by an application of the user terminal 200 and an authority value corresponding to the requested vehicle data, and transmit them to the user terminal 200. For example, when an application of the user terminal 200 requests GPS data, vehicle speed data, and steering angle data of the steering wheel 31 as vehicle data, the vehicle 100 may determine that the authority B corresponds to the GPS data, the vehicle speed data, and the steering angle data of the steering wheel 31 and transmit the authority B to the user terminal 200, together with the GPS data, the vehicle speed data, and the steering angle data of the steering wheel 31.

The user terminal 200 drives at least one application installed therein and receives vehicle data and an authority value transmitted from the vehicle 100.

Furthermore, the user terminal 200 requests the certificate server 300 to provide at least one certificate corresponding to each application, receives the at least one certificate from the certificate server 300, and compares the at least one certificate with an authority value received from the vehicle 100.

Then the user terminal 200 detects a certificate including the authority value received from the vehicle 100 from the at least one certificate, and permits an application corresponding to the certificate to access the vehicle data.

For example, if the user terminal 200 receives the authority B in a state in which a plurality of applications installed in the user terminal 200 are a first application, a second application, and a third application, a certificate for the first application includes the authority A, a certificate for the second application includes the authorities A and B, and a certificate for the third application includes the authorities A, B, and C, then the user terminal 200 permits the second and third applications each including the authority B to access the vehicle data.

The applications achieving permission to access the vehicle data (i.e., the second and third applications) may enable the user terminal 200 to display content to a user using the vehicle data or to transmit the vehicle data transmitted to the user terminal 200 to an application server.

The certificate server 300 stores authority information (i.e., a certificate) corresponding to each application. When the user terminal 200 transmits a signal requesting a certificate to the certificate server 300 via a wired/wireless communication network, the certificate server 300 receives this signal and transmits at least one certificate corresponding to at least one application installed in the user terminal 200 to the user terminal 200.

Figure 5:
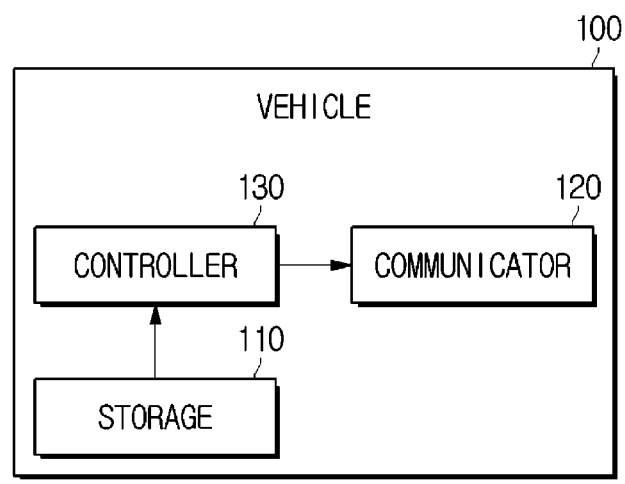
FIG. 5 is a control block diagram of a vehicle in accordance with one exemplary embodiment.

The vehicle 100 included in the vehicle system 1 in accordance with one embodiment will be described in detail with reference to FIG. 5 below. FIG. 5 is a control block diagram of a vehicle in accordance with one embodiment.

The vehicle 100 in accordance with one embodiment includes a storage 110 which stores authority values, a communicator 120 which transmits vehicle data generated by at least one vehicular component and the authority value stored beforehand to the user terminal 200, and a controller 130 which generates a control signal for controlling the storage 110 and the communicator 120 of the vehicle 100.

The storage 110 includes a program region storing a program related to operating functions of elements of the vehicle 100, and a data region storing data regarding use of these elements.

In accordance with one embodiment, at least one authority value which is input by an operator op during a manufacture or maintenance process of the vehicle 100 may be stored beforehand in the data region.

In accordance with another embodiment, information regarding the types of vehicle data corresponding to authority values may be stored in the data region. For example, in the data region, gas mileage information, fuel injection amount data, and vehicle mileage data may be stored to respectively correspond to the authority A, the authority B, and the authority C.

The communicator 120 is connected to the user terminal 200 via a wired/wireless network. The communicator 120 may include the terminal connecter P described above with reference to FIG. 2, include a USB port, an AUX port, a cigar jack, etc., and be connected to the user terminal 200 via wire (i.e., a cable).

Furthermore, as described above with reference to FIG. 3, the communicator 120 may include a wireless communication module, such as a Bluetooth module, a Wifi module, a wireless broadband module, an infrared communication module, an RFID communication module, an NFC communication module, or a Zigbee communication module, and may be connected to the user terminal 200 via a wireless network.

In accordance with one embodiment, the communicator 120 transmits vehicle data generated by at least one vehicular component and an authority value to the user terminal 200.

In accordance with another embodiment, the communicator 120 may receive a signal requesting vehicle data from the user terminal 200. In this case, the communicator 120 may transmit the vehicle data and an authority value corresponding to the vehicle data requested by the user terminal 200 to the user terminal 200. For example, when the user terminal 200 request gas mileage information, the communicator 120 may transmit the gas mileage information and the authority A corresponding to the gas mileage information to the user terminal 200.

The controller 130 may control the storage 110 and the communicator 120, and may further control at least one of other various vehicular components. Here, the other various vehicular components are not shown but may be various electronic components which are included or installed in the vehicle 100 and generate data as described above.

In accordance with one embodiment, the controller 130 may control the communicator 120 to transmit vehicle data generated by at least one vehicular component and an authority value stored in the storage 110.

In accordance with another embodiment, the controller 130 may determine vehicle data corresponding to a signal requesting the vehicle data, which is received from the user terminal 200, and determine an authority value corresponding to the vehicle data among the at least one authority value stored in the storage 110.

The controller 130 may include a processor, a read-only memory (ROM) storing a control program for controlling the vehicle 100, and a random access memory (RAM) which stores a signal or data input from the outside of the vehicle 100 or which is used as a storage region corresponding to various operations performed by the vehicle 100. Alternatively, the controller 130 may include a graphic processing board in which a processor, a RAM, or a ROM is included in an additional circuit board electrically connected to the controller 130. The processor, the RAM, and the ROM may be connected to one another via an internal bus. The controller 130 may be used as a term indicating a component including a processor, a RAM, and a ROM. Alternatively, the controller 130 may be used as a term indicating a component including a processor, a RAM, a ROM, and a processing board.

Figure 6:
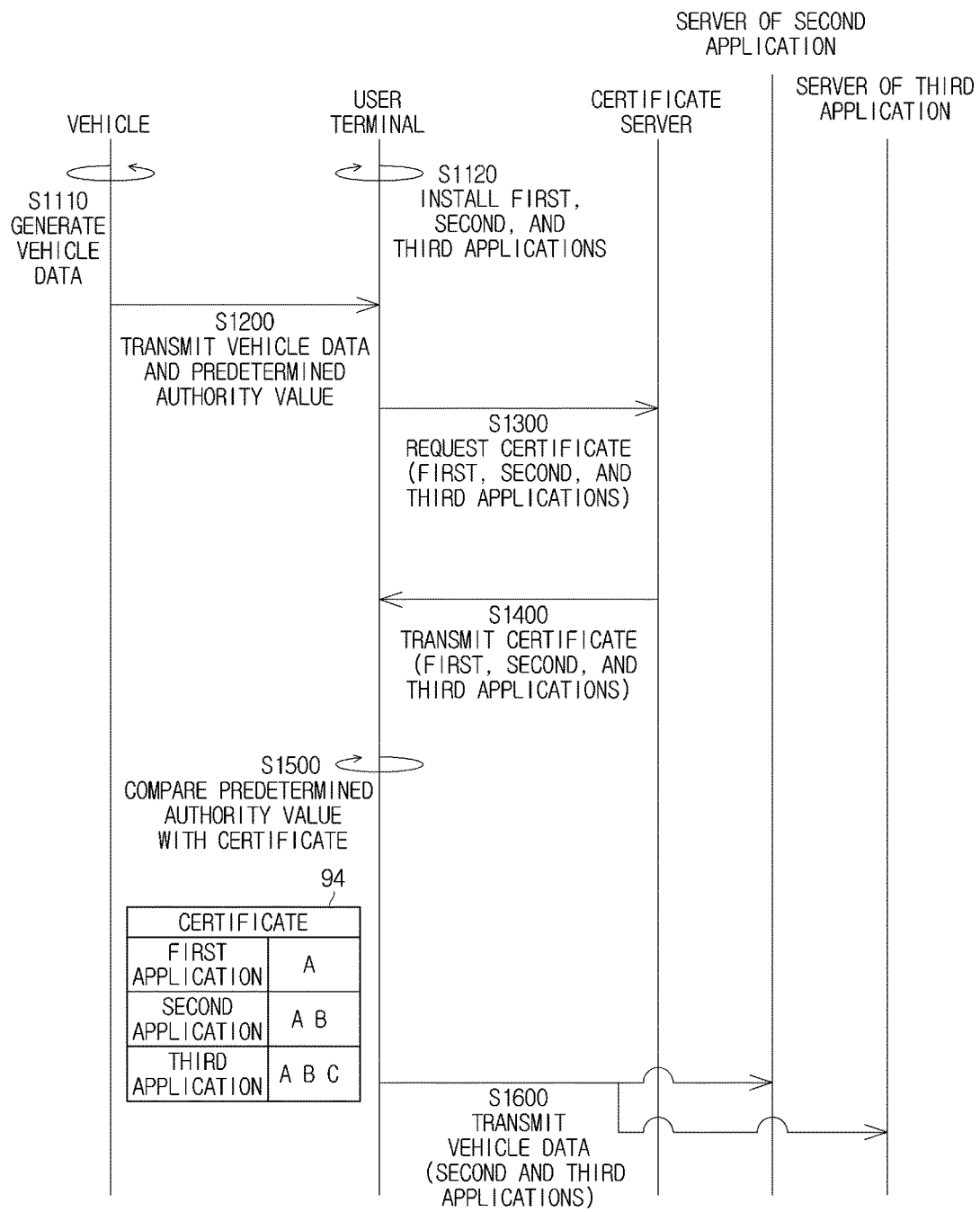
FIG. 6 is a flowchart of a method for controlling a vehicle system in accordance with one exemplary embodiment.

A method of controlling a vehicle system in accordance with one embodiment will be described with reference to FIG. 6 below. FIG. 6 is a flowchart of a method of controlling a vehicle system in accordance with one embodiment.

Elements of the vehicle 100 which will be described with reference to FIG. 6 below are the same as those of the vehicle 100 described above with reference to FIGS. 1 to 5 and will be thus described by assigning the same reference numerals as those of the vehicle 100 to them.

First, the vehicle 100 generates vehicle data in a state in which an authority value is stored therein by an operator op (S1110), and at least one application is installed in the user terminal 200 (S1120).

For example, the vehicle 100 may generate, as the vehicle data, location data of the vehicle 100, vehicle speed data, and steering angle data of the steering wheel 31. In the user terminal 200, a first application, a second application, and a third application may be installed. The first to third applications may request the location data, the vehicle speed data, and the steering angle data of the steering wheel 31.

Next, the vehicle 100 transmits the stored authority value and the generated vehicle data to the user terminal 200 (S1200).

For example, the vehicle 100 may transmit, to the user terminal 200, location data of the vehicle 100, vehicle speed data, and steering angle data of the steering wheel 31 generated by a plurality of vehicular components, and authority B stored beforehand in the vehicle 100.

Then, the user terminal 200 requests the certificate server 300 to provide a certificate for at least one application installed in the user terminal 200 (S1300), and receives the certificate therefor from the certificate server 300 (S1400).

For example, a certificate for the first application may include authority A, a certificate for the second application may include the authorities A and B, and a certificate for the third application may include the authorities A and B and authority C.

The authority A representing that all applications are accessible, the authority B representing that only an application certified by the certificate server 300 is accessible, and the authority C representing that only a specific application certified by the certificate server 300 and previously set or designated is accessible may be authority values.

Thereafter, the user terminal 200 compares an authority value received from the vehicle 100 with at least one certificate received from the certificate server 300, and determines a certificate including the authority value received from the vehicle 100 (S1500).

For example, when the authority B is transmitted from the vehicle 100, the user terminal 200 determines the certificates for the second and third applications each including the authority B among the certificate for the first application, the certificate for the second application, and the certificate for the third certificate.

Next, the user terminal 200 may permit an application corresponding to the certificate including the authority value received from the vehicle 100 to access the vehicle data, and transmit the vehicle data to a server of the application (S1600).

For example, the user terminal 200 may permit the second and third applications each including the authority B to access the vehicle data, and transmit the vehicle data to a server of the second application 2 and a server of the third application 3.

As is apparent from the above description, according to a vehicle, a vehicle system including the vehicle, and a method of controlling the vehicle system in accordance with the embodiments disclosed herein, the vehicle may directly set authority to access vehicle data, which is generated by the vehicle, in units of applications. Thus, the vehicle may have the initiative to set authority with respect to an application.

Furthermore, according to a vehicle, a vehicle system including the vehicle, and a method of controlling the vehicle system in accordance with the embodiments disclosed herein, only an application assigned authority to access vehicle data is permitted to access the vehicle data, thereby maximizing security for the vehicle data.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

While exemplary embodiments have been described in the present disclosure, those skilled in the art, having the benefit of this disclosure, will appreciate that other embodiments can be devised which do not depart from the scope as disclosed herein. Accordingly, the scope should be limited only by the attached claims.

What is claimed is:

1. A vehicle comprising:
   a storage to store at least one authority value representing authority to access vehicle data generated by at least one vehicular component;
   a communicator to transmit the vehicle data and the authority value to a user terminal, and
   a controller to determine the authority value corresponding to the vehicle data, and transmit a certificate including the authority value to the user terminal so that the user terminal determines whether to access the vehicle data only for the application including the authority value;
   wherein the storage further stores information regarding the vehicle data corresponding to the authority value, and the communicator transmits the authority value corresponding to the vehicle data to the user terminal.

2. The vehicle according to claim 1, wherein the storage stores at least one among a first authority value representing that all applications are accessible, a second authority value representing that only a certified application is accessible, and a third authority value representing that only a selected application is accessible.

3. The vehicle according to claim 1, wherein the communicator receives a signal requesting vehicle data from the user terminal, and transmits the vehicle data requested by the user terminal and the authority value corresponding to the requested vehicle data to the user terminal.

4. A vehicle system comprising:
a vehicle to transmit at least one authority value representing authority to access vehicle data generated by at least one vehicular component and the vehicle data to a user terminal; and
the user terminal in which at least one application is installed, the user terminal configured to permit an application having a certificate including the authority value to access the vehicle data,
wherein the vehicle stores information regarding the vehicle data corresponding to the authority value, and transmits the authority value corresponding to the vehicle data to the user terminal,
wherein the vehicle determines the authority value corresponding to the vehicle data and transmits the authority value corresponding to the vehicle data to the user terminal.

5. The vehicle system according to claim 4, further comprising a certificate server to transmit a certificate of the at least one application installed in the user terminal.

6. The vehicle system according to claim 5, wherein the user terminal transmits a signal requesting a certificate to the certificate server.

7. The vehicle system according to claim 4, wherein the vehicle transmits, to the user terminal, one of a first authority value representing that all applications are accessible, a second authority value representing that only a certified application is accessible, and a third authority value representing that only a selected application is accessible.

8. The vehicle system according to claim 4, wherein the user terminal transmits the vehicle data to a server of an application having a certificate including the authority value.

9. The vehicle system according to claim 4, wherein the user terminal transmits a signal requesting vehicle data to the vehicle, and the vehicle transmits the vehicle data requested by the user terminal and the authority value corresponding to the requested vehicle data to the user terminal.

10. A method of controlling a vehicle system, the method comprising steps of:
transmitting at least one authority value representing authority to access vehicle data generated by at least one vehicular component and the vehicle data to a user terminal; and
permitting an application having a certificate including the authority value to access the vehicle data,
wherein the step of transmitting the authority value and the vehicle data to the user terminal comprises transmitting the authority value corresponding to the vehicle data to the user terminal,
wherein the step of transmitting the authority value and the vehicle data to the user terminal comprises determining the authority value corresponding to the vehicle data and transmitting the authority value corresponding to the vehicle data to the user terminal.

11. The method according to claim 10, further comprising a step of receiving the certificate of an application installed in the user ten Anal before the step of permitting the application to access the vehicle data.

12. The method according to claim 11, further comprising a step of transmitting a signal requesting the certificate to a certificate server before the step of receiving the certificate.

13. The method according to claim 10, wherein the step of transmitting the authority value and the vehicle data to the user terminal comprises transmitting, to the user terminal, one of a first authority value representing that all applications are accessible, a second authority value representing that only a certified application is accessible, and a third authority value representing that only a selected application is accessible.

14. The method according to claim 10, further comprising a step of transmitting the vehicle data to a server of an application having the certificate including the authority value.

* * * * *